United States Patent
Palo

(10) Patent No.: US 7,921,641 B2
(45) Date of Patent: Apr. 12, 2011

(54) ARRANGEMENT AND METHOD FOR DELIVERING HYDRAULIC FLUID IN A WORK VEHICLE

(75) Inventor: Markku Palo, Eskilstuna (SE)

(73) Assignee: Volvo Construction Equipment AB, Eskilstuna (SE)

(*) Notice: Subject to any disclaimer, the term of this patent is extended or adjusted under 35 U.S.C. 154(b) by 530 days.

(21) Appl. No.: 12/160,614

(22) PCT Filed: Mar. 13, 2006

(86) PCT No.: PCT/SE2006/000324
§ 371 (c)(1),
(2), (4) Date: Jul. 11, 2008

(87) PCT Pub. No.: WO2007/105994
PCT Pub. Date: Sep. 20, 2007

(65) Prior Publication Data
US 2009/0000291 A1    Jan. 1, 2009

(51) Int. Cl.
*F15B 11/17* (2006.01)
*E02F 9/22* (2006.01)
(52) U.S. Cl. .............. 60/421; 60/469; 60/486
(58) Field of Classification Search .............. 60/421, 60/469, 484, 486
See application file for complete search history.

(56) References Cited

U.S. PATENT DOCUMENTS

| | | | | |
|---|---|---|---|---|
| 3,841,795 | A | * | 10/1974 | Ferre et al. .................. 60/486 |
| 4,838,756 | A | | 6/1989 | Johnson et al. |
| 5,369,948 | A | * | 12/1994 | Vertens et al. ................ 60/790 |
| 5,410,879 | A | * | 5/1995 | Houze ......................... 60/469 |
| 5,447,050 | A | * | 9/1995 | Pahnke ....................... 72/453.02 |
| 6,170,261 | B1 | | 1/2001 | Ishizaki et al. |
| 6,772,589 | B2 | * | 8/2004 | Schienbein et al. ........... 60/421 |

FOREIGN PATENT DOCUMENTS
EP    1286058 A2    2/2003

OTHER PUBLICATIONS

PCT International Search Report, mailed Oct. 17, 2006, in connection with International Application No. PCT/SE2006/000324.

* cited by examiner

*Primary Examiner* — Thomas E Lazo
(74) *Attorney, Agent, or Firm* — WRB-IP LLP

(57) ABSTRACT

An arrangement for delivering hydraulic fluid to at least one hydraulic actuator of a work vehicle for moving a work implement and/or steering the vehicle includes at least two pumps which are adapted to be operatively driven by a power source and adapted to operatively drive said at least one hydraulic actuator via hydraulic fluid. A first pump is operated with a phase shift relative to a second pump.

14 Claims, 3 Drawing Sheets

ARRANGEMENT AND METHOD FOR DELIVERING HYDRAULIC FLUID IN A WORK VEHICLE

BACKGROUND AND SUMMARY

The present invention relates to an arrangement for delivering hydraulic fluid to at least one hydraulic actuator of a work vehicle for moving a work implement and/or steering the vehicle, comprising at least two pumps, which are adapted to be operatively driven by a power source and adapted to operatively drive said at least one hydraulic actuator via hydraulic fluid. The invention also relates to a corresponding method for delivering hydraulic fluid to at least one hydraulic actuator of a work vehicle.

The term "work vehicle" comprises different types of material handling vehicles like construction machines, such as a wheel loader, an articulated hauler, a backhoe loader, a motor grader and an excavator. Further terms frequently used for work vehicles are "earth-moving machinery" and "off-road work machines". The work vehicles are for example utilized for construction and excavation work, in mines etc. The invention will be described below in a case in which it is applied in a wheel loader. This is to be regarded only as an example of a preferred application.

There is a desire to improve the working environment of a work vehicle operator with regard to noise, vibrations, shocks etc.

It is desirable to achieve an arrangement for delivering hydraulic fluid to at least one hydraulic actuator of a work vehicle, which creates conditions for a reduced noise and/or reduced vibrations during operation.

According to an aspect of the present invention, an arrangement is provided for delivering hydraulic fluid to at least one hydraulic actuator of a work vehicle for moving a work implement and/or steering the vehicle, comprising at least two pumps, which are adapted to be operatively driven by a power source and adapted to operatively drive said at least one hydraulic actuator via hydraulic fluid characterized in that a first pump is operated with a phase shift relative to a second pump.

In other words, the pumps are adapted so that a piston of a first pump is operated with a phase shift relative to a piston of a second pump. In this way, the pump pulsations in the hydraulic system will be reduced, which in turn leads to a reduced noise and/or vibrations during operation. Thus, the working environment for the vehicle operator is improved. A further advantage is that the hydraulic components in the system will be exposed to less stresses, which creates conditions for longer life.

According to one embodiment, the first pump is adapted to be operated with a constant phase shift relative to the second pump. This may be achieved in a cost-efficient way in that the pumps are arranged with said constant phase shift relative one another during assemblying. Thus, the positions of the pistons of the pumps are mechanically adjusted with regard to one another. In such a case, the operator of the vehicle can not interfere with the phase shift during operation. In other words, the first pump is manually rotated a predetermined angle relative to the second pump in order to accomplish said phase shift during assembly. The pumps are preferably operatively coupled to a common output from the power source.

Further preferred embodiments and advantages will be apparent from the following description and drawings.

BRIEF DESCRIPTION OF THE DRAWINGS

The invention will be explained below, with reference to the embodiments shown oil the appended drawings, wherein FIG. 1 schematically shows a wheel loader in a side view, and FIG. 2 schematically shows an exemplary embodiment of a driveline for the wheel loader.

DETAILED DESCRIPTION

Figure 1:
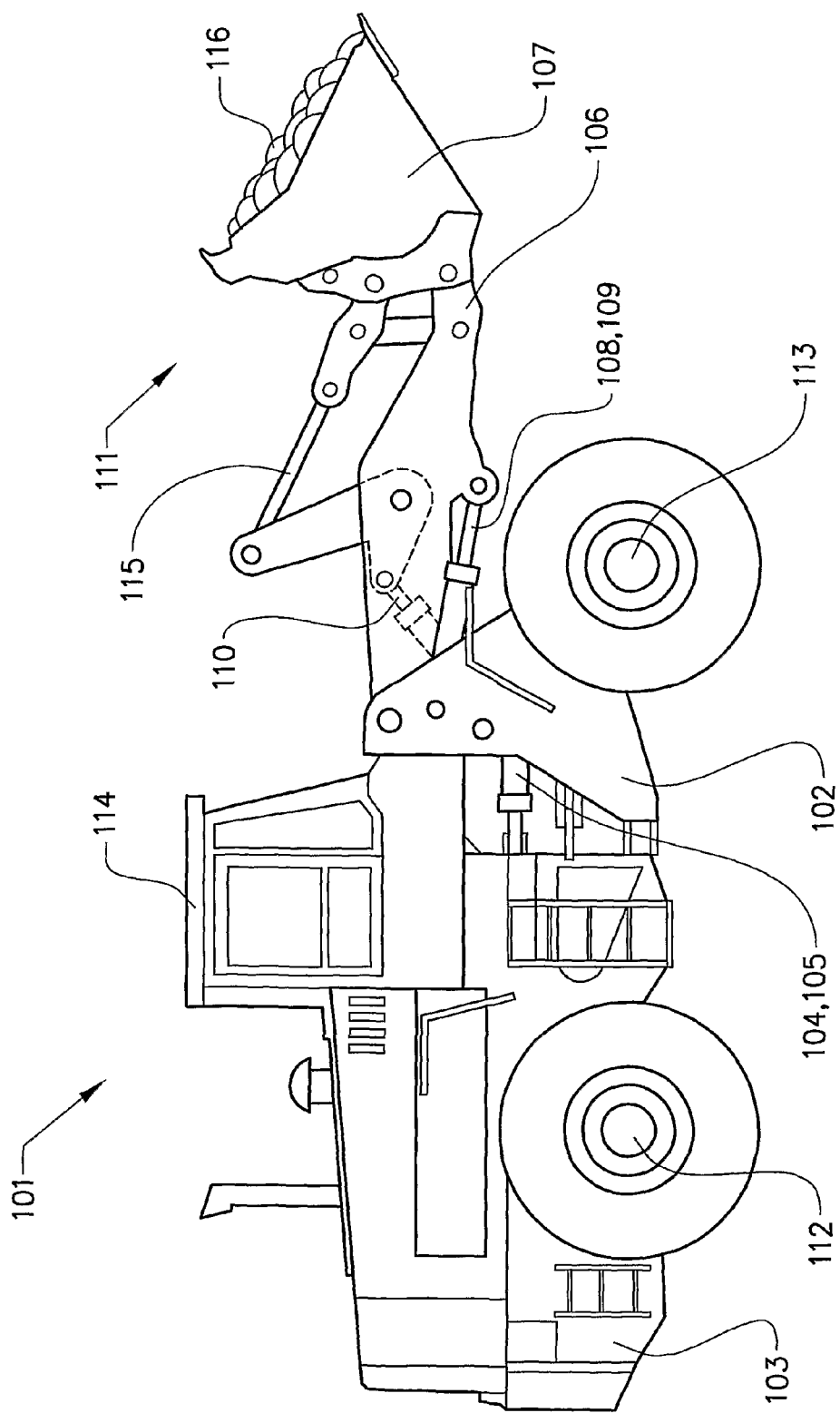

FIG. 1 shows a wheel loader 101. The body of the wheel loader 101 comprises a front body section 102 with a front frame, and a rear body section 103 with a rear frame, which sections each has a pair of half shafts 112, 113. The rear body section 103 comprises a cab 114. The body sections 102, 103 are connected to each other via an articulation joint in such a way that they can pivot in relation to each other around, a vertical axis. The pivoting motion is achieved by means of two first actuators in the form of hydraulic cylinders 104, 105 arranged between the two sections. Thus, the wheel loader is an articulated work vehicle. The hydraulic cylinders 104, 105 are thus arranged one on each side of a horizontal centerline of the vehicle in a vehicle traveling direction in order to turn the wheel loader 101.

The wheel loader 101 comprises an equipment 111 for handling objects or material. The equipment 111 comprises a load-arm unit 106 and a work implement 107 in the form of a bucket fitted on the load-arm unit. A first end of the load-arm unit 106 is pivotally connected to the front vehicle section 102. The implement 107 is pivotally connected to a second end of the load-arm unit 106.

The load-arm unit 106 can be raised and lowered relative to the front section 102 of the vehicle by means of two second actuators in the form of two hydraulic cylinders 108, 109, each of which is connected at one end to the front vehicle section 102 and at the other end to the load-arm unit 106. The bucket 107 can be tilted relative to the load-arm unit 106 by means of a third actuator in the form of a hydraulic cylinder 110, which is connected at one end to the front vehicle section 102 and at the other end to the bucket 107 via a link-arm system 115.

Figure 2:
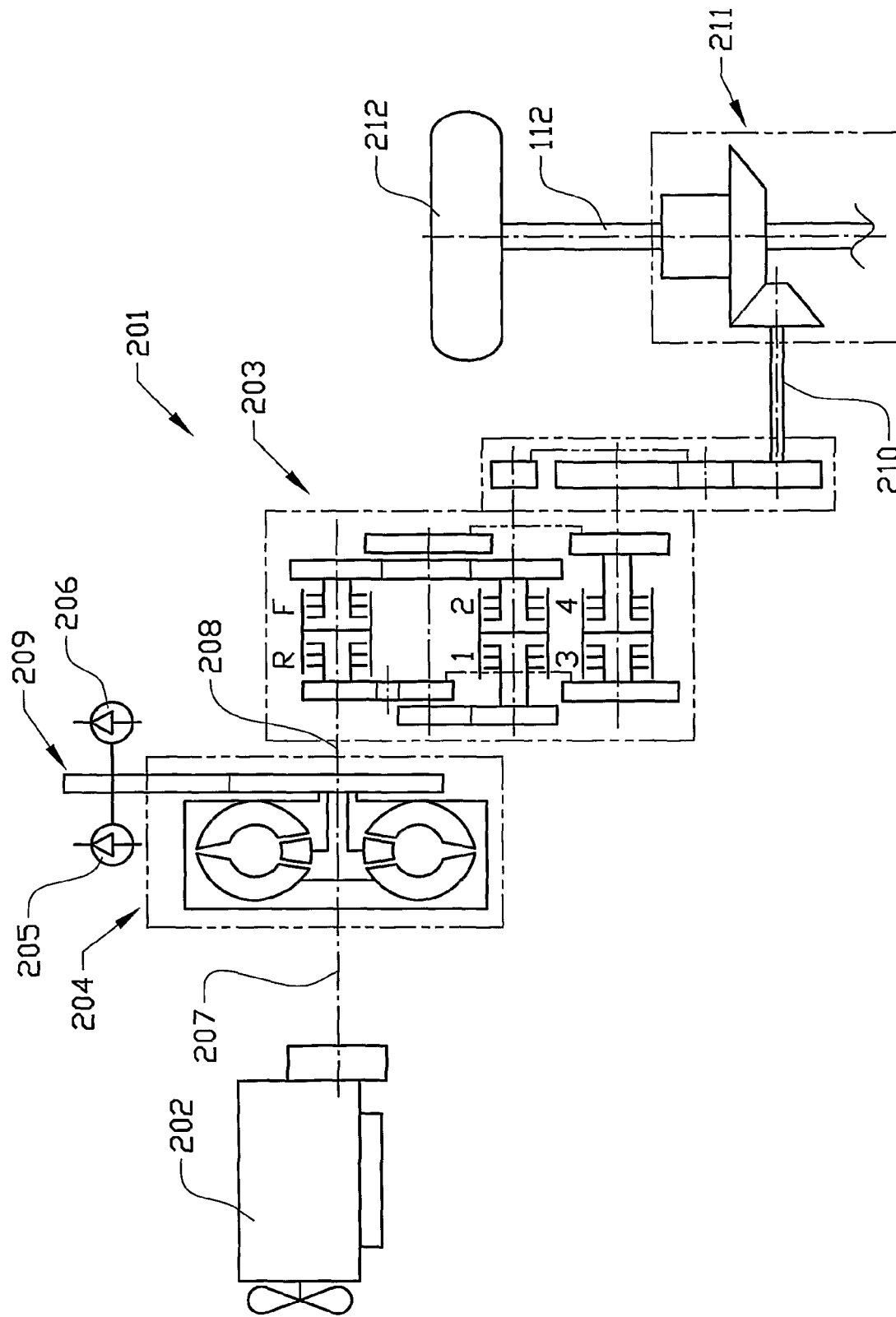

FIG. 2 illustrates schematically an example of the wheel loader's 101 powertrain 201. The powertrain 201 comprises an internal combustion engine 202, in the form of a diesel engine, an automatic gearbox 203 and a hydrodynamic torque converter 204. Advantageously, the engine comprises a turbocharger (not shown). The gearbox 203 consists of or comprises an electrically controlled automatic gearbox of the power-shift type.

FIG. 2 also shows two pumps 205, 206 in the wheel loader's hydraulic system for supplying the hydraulic cylinders 104, 105, 108, 109, 110 with hydraulic fluid. The pumps 205, 206 (like the torque converter 204) is driven by an output shaft 207 from the engine 202. In the illustrated embodiment, the pumps 205, 206 are drivingly connected between the torque converter 204 and the gearbox 203. However, also other positions of the pumps in the powertrain are feasible. The pumps 205, 206 are driven by a torque converter output shaft 208 via a transmission 209. An output shaft 210 from the gearbox 203 leads to a differential gear 211, which is drivingly connected to said half-shafts 112, on which the vehicle's driving wheels 212 are arranged.

Figure 3:
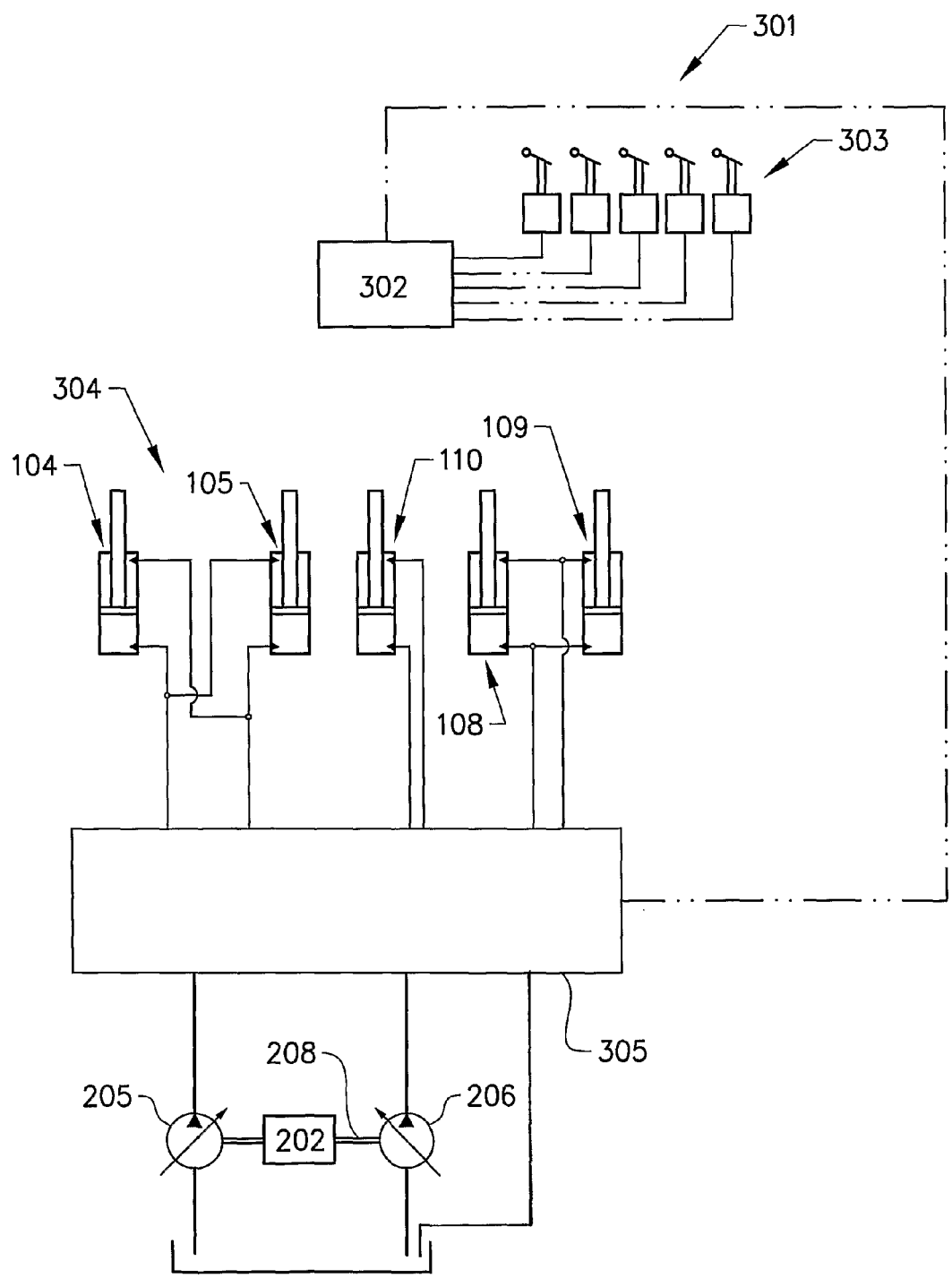
FIG. 3 illustrates diagrammatically a preferred embodiment of an arrangement for controlling the wheel loader.

FIG. 3 illustrates an embodiment of an arrangement 301 for delivering hydraulic fluid to the hydraulic cylinders 104, 105, 108, 109, 110 in the wheel loader 101. The solid lines indicate main hydraulic conduits and the lines with a longer dash followed by two shorter dashes indicate lines for electric signals.

It is schematically shown in FIG. 3 that the pumps 205, 206 are drivingly connected to the engine 202.

The control arrangement 301 comprises a control unit 302, or computer. A number of electric operating levers 303 arranged in the cab are connected to the control unit 302, and this is adapted to handle the signals from the levers. The control arrangement 301 comprises a hydraulic system 304. A system of a number of electrically controlled hydraulic valve units 305 are electrically connected to the control unit 302 and hydraulically connected between the pumps 205, 206 and the hydraulic cylinders 104, 105, 108, 109, 110 for regulating the reciprocating work of these. The system of hydraulic valve units 305 are, for ease of presentation, represented by a single box 305. The first and second pump 205 and 206, respectively are provided in order to supply the hydraulic cylinders 104, 105, 108, 109, 110 with hydraulic oil through the hydraulic valve units 305. Each of said valve units comprises a directional control valve (not shown). The directional control valve has a pair of service passages being connected to opposite ends of each of the double-acting hydraulic cylinders.

Both pumps 205, 206 have variable displacement. The hydraulic output by the pumps can thereby be controlled. The pumps 205, 206 feed hydraulic fluid to said actuators 104, 105, 108, 109, 110 and the associated loads coupled thereto through fluid supply conduits.

The pumps 205, 206 are operatively coupled to a common output 208 from the engine 202. The pumps 205, 206 thus have the same rotational speed. More specifically, the pumps 205, 206 are coupled to the engine 202 in such a manner that they are indexed with regard to one another in order to achieve a certain phase shift. Thus, a first pump 205 is operated with a phase shift relative to a second pump 206. Preferably, the first pump 205 is adapted to be operated with a constant phase shift relative to the second pump 206.

The pumps 205, 206 comprise a plurality of pistons each. Preferably, the pumps 205, 206 comprise the same number of pistons. In a preferred embodiment, each pump comprises nine pistons.

According to one preferred embodiment of the invention, the arrangement comprises two pumps, each having nine pistons. A preferred phase shift between the two pumps may be calculated with the formula 360°/(no. of pumps*no. of pistons). Thus, in the case of two pumps, each having nine pistons, the phase shift would turn out to be about 20°. The invention is however not limited to this value. Instead, a phase shift in the range of 2-40° is within the scope of the invention. In fact, computations show that for the inventive arrangement comprising two pumps, each having nine pistons, a phase shift of about 5° is most preferred. A preferred range is therefore 2-15°.

In order to minimize pressure ripple (noise), the pumps are operated at exactly the same rotation speed and with the same phase shift between any two successive piston strokes.

The invention is not in any way limited to the above described embodiments, instead a number of alternatives and modifications are possible without departing from the scope of the following claims.

The power source (prime mover) may not necessarily be an internal combustion engine, in the form of a diesel engine. Instead also other power sources, such as gasoline operated internal combustion engines, electric motors, alternative fuel prime movers and fuel cells may be used.

The invention claimed is:

1. An arrangement for delivering hydraulic fluid to at least one hydraulic actuator of a work vehicle for moving a work implement and/or steering the vehicle, comprising at least two pumps, which are adapted to be operatively driven by a power source and adapted to operatively drive the at least one hydraulic actuator via hydraulic fluid wherein a first pump is operated with a phase shift relative to a second pump.

2. An arrangement according to claim 1, wherein the first pump is adapted to be operated with a constant phase shift relative to the second pump.

3. An arrangement according to claim 2, wherein the pumps are coupled to the power source in such a manner that they are indexed with regard to one another so as to achieve the constant phase shift.

4. An arrangement according to claim 1, wherein the pumps are operatively coupled to a common output from the power source.

5. An arrangement according to claim 1, wherein the first pump is adapted to be operated with a phase shift in the range of 2-15° relative to the second pump.

6. An arrangement according to claim 1, wherein the first pump is adapted to be operated with a phase shift of about 5° relative to the second pump.

7. An arrangement according to claim 1, wherein the power source is an internal combustion engine.

8. A work vehicle comprising the arrangement as claimed in claim 1.

9. A method for delivering hydraulic fluid to at least one hydraulic actuator of a work vehicle for moving a work implement and/or steering the vehicle comprising
   using at least two pumps, which are operatively driven by a power source, to operatively drive the at least one hydraulic actuator via hydraulic fluid, and
   operating a first pump of the at least two pumps with a phase shift relative to a second pump of the at least two pumps.

10. A method according to claim 9 comprising operating the first pump with a constant phase shift relative to the second pump.

11. A method according to claim 9, comprising operatively driving the pumps by a common output from the power source.

12. A method according to claim 9, comprising operatively driving the pumps by the power source in an indexed manner with regard to one another.

13. A method according to claim 9, comprising operating the first pump with a phase shift in the range of 2-15° relative to the second pump.

14. A method according to claim 9, comprising operating the first pump with a phase shift of about 5° relative to the second pump.

* * * * *